US012514411B2

(12) United States Patent
Pocock et al.

(10) Patent No.: US 12,514,411 B2
(45) Date of Patent: Jan. 6, 2026

(54) DISPENSER

(71) Applicant: Balco Global Limited, Wiltshire (GB)

(72) Inventors: Reuben Pocock, Wiltshire (GB); Brendan Pocock, Wiltshire (GB)

(73) Assignee: Balco Global Limited, Wiltshire (GB)

( * ) Notice: Subject to any disclaimer, the term of this patent is extended or adjusted under 35 U.S.C. 154(b) by 0 days.

(21) Appl. No.: 18/685,723

(22) PCT Filed: Aug. 24, 2022

(86) PCT No.: PCT/IB2022/057933
§ 371 (c)(1),
(2) Date: Feb. 22, 2024

(87) PCT Pub. No.: WO2023/026211
PCT Pub. Date: Mar. 2, 2023

(65) Prior Publication Data

US 2025/0127344 A1 Apr. 24, 2025

(30) Foreign Application Priority Data

Aug. 24, 2021 (GB) .................................... 2112135

(51) Int. Cl.

| | |
|---|---|
| ***A47H 1/10*** | (2006.01) |
| ***A47G 25/06*** | (2006.01) |
| ***A47G 29/08*** | (2006.01) |
| ***A47K 10/32*** | (2006.01) |
| ***H01F 7/02*** | (2006.01) |
| *A47K 10/18* | (2006.01) |

(52) U.S. Cl.
CPC ........... *A47K 10/32* (2013.01); *H01F 7/0252* (2013.01); *A47K 10/18* (2013.01); *A47K 2010/3233* (2013.01); *A47K 2201/02* (2013.01)

(58) Field of Classification Search
CPC .... A47G 25/0642; A47K 10/32; A47K 10/10; A47K 2010/3233; A47K 2201/02; A47K 10/185; A47K 10/426; A47K 10/18; H01F 7/0252; F16B 2200/83; Y10S 206/806; Y10S 248/905; B65D 2313/04
USPC ........................................ 206/527; 242/588.3
See application file for complete search history.

(56) References Cited

U.S. PATENT DOCUMENTS 2,023,542 A * 12/1935 Peck ........................ B65D 5/16 221/48
2,216,323 A * 10/1940 Ringler ............. B65D 83/0847 221/148
(Continued)

FOREIGN PATENT DOCUMENTS

GB 2351758 A * 1/2001 ............... A47H 1/10
GB 2431861 B * 7/2008 ............... A47H 1/13
(Continued)

OTHER PUBLICATIONS

PCT International Search Report for PCT/IB2022/057933 dated Jan. 30, 2023.

*Primary Examiner* — Gideon R Weinerth

(57) ABSTRACT

There is provided a dispenser for removably securing to a mount. The dispenser comprises a frame, a shell surrounding the frame and attachment means for removably securing the dispenser to the mount. The shell and the frame comprise flexible material, and the shell comprises an opening for dispensing items.

8 Claims, 4 Drawing Sheets

(56) References Cited

U.S. PATENT DOCUMENTS

| | | | | | |
|---|---|---|---|---|---|
| 2,991,036 | A | * | 7/1961 | Morgan | A47G 1/17<br>248/905 |
| 3,229,844 | A | * | 1/1966 | Simon | A47K 10/185<br>248/905 |
| 3,285,559 | A | * | 11/1966 | Simon | A47F 1/04<br>221/46 |
| 3,642,122 | A | * | 2/1972 | Von Ende | B65F 1/141<br>224/547 |
| 4,094,416 | A | * | 6/1978 | Smith | A47B 45/00<br>D6/520 |
| 4,896,773 | A | | 1/1990 | Zilio | |
| 5,573,216 | A | * | 11/1996 | Kuroda | A47K 10/185<br>248/905 |
| D437,167 | S | * | 2/2001 | Hardaway | D6/570 |
| 6,196,435 | B1 | * | 3/2001 | Wu | B60R 7/084<br>224/572 |
| 6,708,841 | B2 | * | 3/2004 | Baughman | A61B 42/40<br>221/281 |
| 6,820,753 | B2 | * | 11/2004 | Kurtz | A47K 10/20<br>211/49.1 |
| 7,131,616 | B2 | * | 11/2006 | Livingstone | A47G 25/0642<br>248/304 |
| 9,221,397 | B1 | * | 12/2015 | Kim | F16M 11/12 |
| D809,318 | S | * | 2/2018 | Hammons | D6/515 |
| 10,709,302 | B2 | * | 7/2020 | Roy | A61L 2/26 |
| 11,069,465 | B1 | * | 7/2021 | McElrath | H01F 7/0242 |
| 11,877,703 | B1 | * | 1/2024 | Kopp | A47K 10/424 |
| 2003/0025057 | A1 | * | 2/2003 | Furukawa | A47K 10/18<br>248/905 |
| 2004/0173719 | A1 | * | 9/2004 | Mitchell | A47G 23/0225<br>248/311.2 |
| 2005/0056646 | A1 | | 3/2005 | Gary | |
| 2008/0314920 | A1 | * | 12/2008 | Rodrigues | A61B 50/20<br>221/63 |
| 2010/0270325 | A1 | * | 10/2010 | Fearon | B65D 83/0805<br>221/199 |
| 2011/0011879 | A1 | * | 1/2011 | Johnson | A47K 10/422<br>221/45 |
| 2012/0273515 | A1 | * | 11/2012 | Hutchison | A47K 10/42<br>221/45 |
| 2013/0105506 | A1 | * | 5/2013 | Frias | A47K 10/421<br>221/45 |
| 2013/0240660 | A1 | * | 9/2013 | Greer | B65H 49/325<br>242/597.5 |
| 2014/0285295 | A1 | * | 9/2014 | Liimatta | A47G 29/10<br>335/285 |
| 2015/0197927 | A1 | * | 7/2015 | Hall | E03D 5/00<br>137/382 |
| 2015/0250364 | A1 | * | 9/2015 | Yamada | A47K 10/42<br>248/311.2 |
| 2015/0329275 | A1 | * | 11/2015 | Silkaitis | B65D 75/54<br>206/278 |
| 2016/0138754 | A1 | * | 5/2016 | Li | B60R 11/02<br>248/206.5 |
| 2016/0174778 | A1 | * | 6/2016 | Khamphilapanyo | B26D 1/025<br>312/349 |
| 2016/0195217 | A1 | * | 7/2016 | Flynn-Parkison | A47G 29/00<br>29/434 |
| 2017/0008691 | A1 | * | 1/2017 | DeGraaf | A61B 50/10 |
| 2017/0225875 | A1 | * | 8/2017 | Schlaupitz | B65D 25/20 |
| 2018/0020886 | A1 | * | 1/2018 | Boeltl | B65H 16/06<br>242/596.4 |
| 2018/0338651 | A1 | * | 11/2018 | Burtt | A47K 3/281 |
| 2019/0008336 | A1 | * | 1/2019 | Hall | A47K 10/424 |
| 2019/0374076 | A1 | * | 12/2019 | deLoache, III | A47K 13/242 |
| 2020/0093336 | A1 | * | 3/2020 | Said | B65D 83/0835 |
| 2020/0328771 | A1 | * | 10/2020 | McMillan, II | H04M 1/04 |
| 2022/0315367 | A1 | * | 10/2022 | Nelson | F16B 1/00 |
| 2022/0378257 | A1 | * | 12/2022 | Thomas | A47K 10/22 |
| 2024/0092558 | A1 | * | 3/2024 | Shihor | A47K 10/426 |
| 2024/0268612 | A1 | * | 8/2024 | Mendes | A47K 10/424 |
| 2025/0113956 | A1 | * | 4/2025 | Schulz | A47K 5/12 |

FOREIGN PATENT DOCUMENTS

| | | | | | |
|---|---|---|---|---|---|
| GB | 2570179 | A | * | 7/2019 | A47G 25/0642 |
| GB | 2588931 | A | | 5/2021 | |
| GB | 2601739 | A | * | 6/2022 | A47G 29/00 |
| GB | 2619525 | A | * | 12/2023 | A47G 1/17 |
| JP | H076180 | U | | 1/1995 | |
| WO | 2013016671 | A1 | | 1/2013 | |
| WO | WO-2023062372 | A1 | * | 4/2023 | A47G 29/08 |
| WO | WO-2023131804 | A1 | * | 7/2023 | E05D 3/02 |

* cited by examiner

DISPENSER

REFERENCE TO RELATED APPLICATIONS

This Application is a U.S. National Stage Filing Under 35 USC 371 of International Application No. PCT/IB2022/057933 filed on Aug. 24, 2022, which claims priority to United Kingdom Application Number 2112135.5 filed on Aug. 24, 2021. This application claims priority to both applications and incorporates them here by reference.

FIELD OF THE INVENTION

The present invention relates to a dispenser, more particularly to a dispenser for removably securing to a mount.

BACKGROUND OF THE INVENTION

An issue in certain institutions (e.g. Psychiatric wards, Prisons, Hospitals) is the increasing number of persons attempting suicide by ligature from a fixed point, by suspended articles, e.g. a curtain bracket or other mounted holder. Whilst various attempts have been made to mitigate this risk, broadly all solutions provide a breakaway portion that detaches the item from the mount to prevent use of the mounted item as a ligature point. However, a consequential issue of various inventions is that the breakaway portion becomes a weapons risk. Breakaway portions, such as dispensers, can be used as a cosh or projectile, causing damage to people or property. Fixed objects are at risk of being used as ligature points, and detachable/movable objects have an associated weapons risk.

A known safety mount is available which provides a planar surface with which to attach an object (e.g. a dispenser). This is attached using magnets from the said system disclosed on GB2351758. A disadvantage of this existing invention is that the said planar surface—typically made of polycarbonate, with a tapered edge on all sides-becomes a heavy weapon with axe-like properties when detached. In this instance, both the breakaway portion and the mount itself become weapons risks.

The present invention aims to at least ameliorate the above-mentioned issues.

SUMMARY OF THE INVENTION

According to a first aspect of the present invention there is provided a dispenser for removably securing to a mount. The dispenser comprises a frame, a shell surrounding the frame, and attachment means for removably securing the dispenser to the mount. The shell and the frame comprise flexible material, and the shell comprises an opening for dispensing items.

Advantageously, the shell and the frame comprising flexible material reduces the likelihood of the dispenser being able to be used as a ligature point or as a weapons risk. If force is applied to the dispenser then even if the dispenser does not detach from the mount as designed it can deform to prevent use as a ligature point. Additionally, using the shell and frame arrangement, with the shell surrounding the frame, prevents any sharp edges being formed from the structure-any corners in the frame are covered by the shell.

The shell may comprise at least two layers; and the frame may be disposed within the at least two layers of the shell. Advantageously, and as discussed above, this prevents any sharp edges or corners of the frame being exposed.

The attachment means may comprise one or more magnetic elements or magnetic counterparts for magnetically attaching the dispenser to the mount. The attachment means may be disposed within the at least two layers of the shell. Advantageously, this reduces the likelihood of a user accessing the magnetic elements or counterparts, which in turn reduces the likelihood of any associated risks associated with these elements (e.g. weapons risk, choking hazard).

The attachment force of the magnetic attachment may be configured to be weaker than 500 Newtons, to allow the dispenser to be easily removed from the mount. The attachment force is capable of retaining the dispenser filled with PPE items, but sufficiently weak such that body weight would cause the dispenser to break away from the mount.

The attachment force may be configured to be weaker than any of 100 Newtons, 200 Newtons, 300 Newtons, 400 Newtons, 500 Newtons or 600 Newtons, or any intermediary force. This may be variable dependent on the items to be dispensed.

The at least two layers of the shell may be stitched and welded. Optionally or preferably the welding may be high frequency or ultrasonically welding.

Advantageously, stitching increases the robustness of the shell joins. Welding advantageously provides a watertight seal. This avoids ingress of (for example) body fluids, reducing risk of infection and improving the hygiene of the dispenser.

The shell material may be vinyl. Vinyl is advantageously a soft material, reducing the potential weapons risk associated with a dispenser. Vinyl is also easy to clean, advantageously improving the hygiene of the dispenser. The shell material may comprise anti-microbial additives or coatings and may be certified for healthcare environments.

The dispenser may be configured to weigh less than 5 kg. Advantageously, a low weight dispenser ensures that the weapons risk associated with the dispenser is reduced. Any impact generated by use of the dispenser as a cosh or projectile is significantly reduced with a lower weight dispenser. Alternatively/additionally, the dispenser may be configured to weigh less than 0.5 kg, 1 kg, 1.5 kg, 2 kg, 2.5 kg, 3 kg, 3.5 kg, 4 kg, 4.5 kg or 5 kg.

The dispensed items may include PPE items such as one or more of tissues, hand towels, aprons, masks, and gloves.

According to a second aspect of the present invention there is provided a dispensing system. The dispensing system comprises a mount; and the dispenser of any embodiment of the first aspect. The mount is configured to attach to a surface such as a wall or a door, and the exposed surface of the mount is substantially planar to avoid ligature points.

The mount may comprise at least one magnetic element corresponding to a magnetic counterpart within the dispenser. The at least one magnetic element may be embedded within the body of the mount. Advantageously, embedding the magnet within the body of the mount reduces the number of potential ligature points with the dispensing system. It also advantageously reduces the likelihood of a user accessing the any magnetic element, which could have various health risks associated with it (e.g. weapons risk, choking hazard).

The mount may further comprise bevelled edges, to avoid ligature points.

These and other aspects of the invention will be apparent from, and elucidated with reference to, the embodiments described hereinafter.

BRIEF DESCRIPTION OF DRAWINGS

Embodiments will be described, by way of example only, with reference to the drawing, in which.

Figure 1:
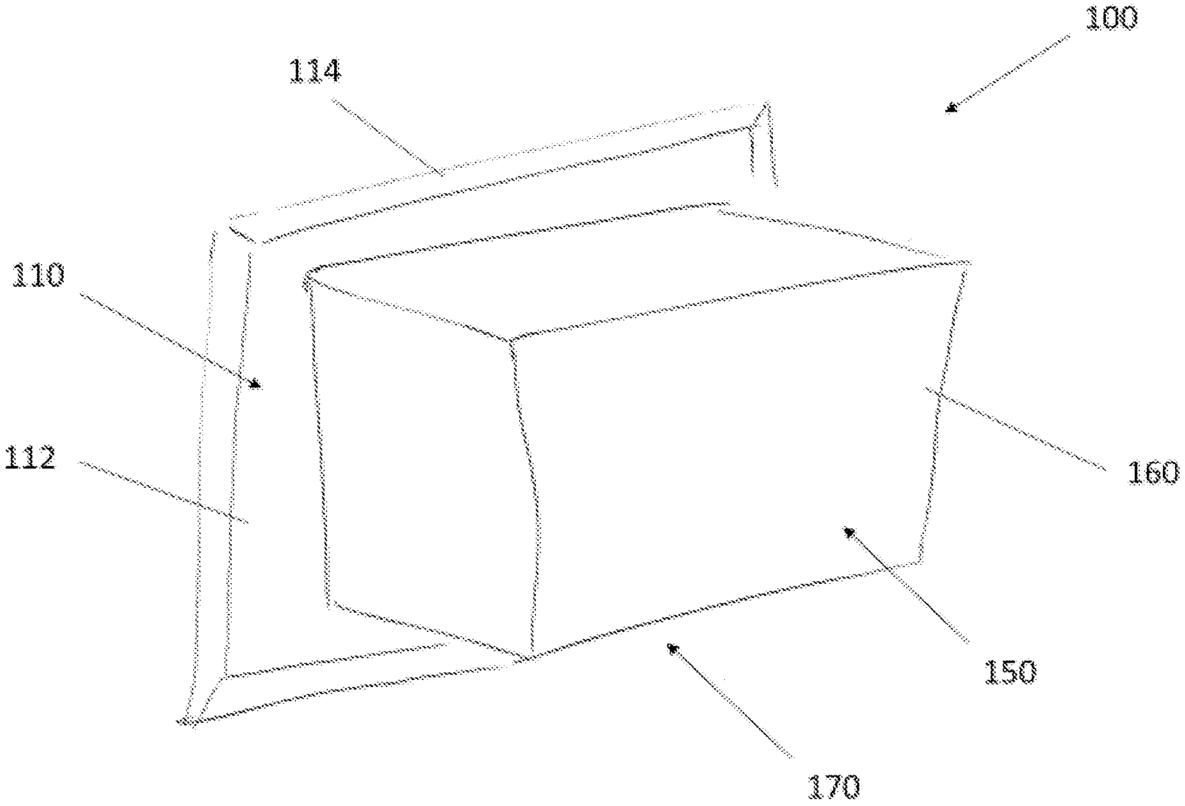
FIG. 1 illustrates a perspective view of a dispensing system, comprising a dispenser and mount.

It should be noted that the Figure is diagrammatic and not drawn to scale. Relative dimensions and proportions of parts of the Figure have been shown exaggerated or reduced in size, for the sake of clarity and convenience in the drawings. The same reference signs are generally used to refer to corresponding or similar feature in modified and different embodiments.

Figure 2A:
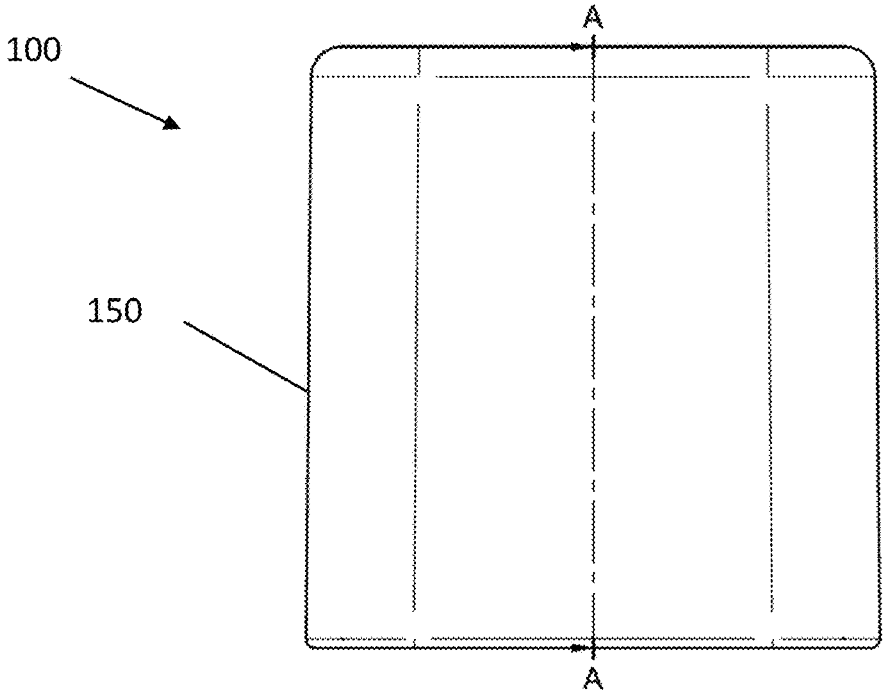
Figure 2B:
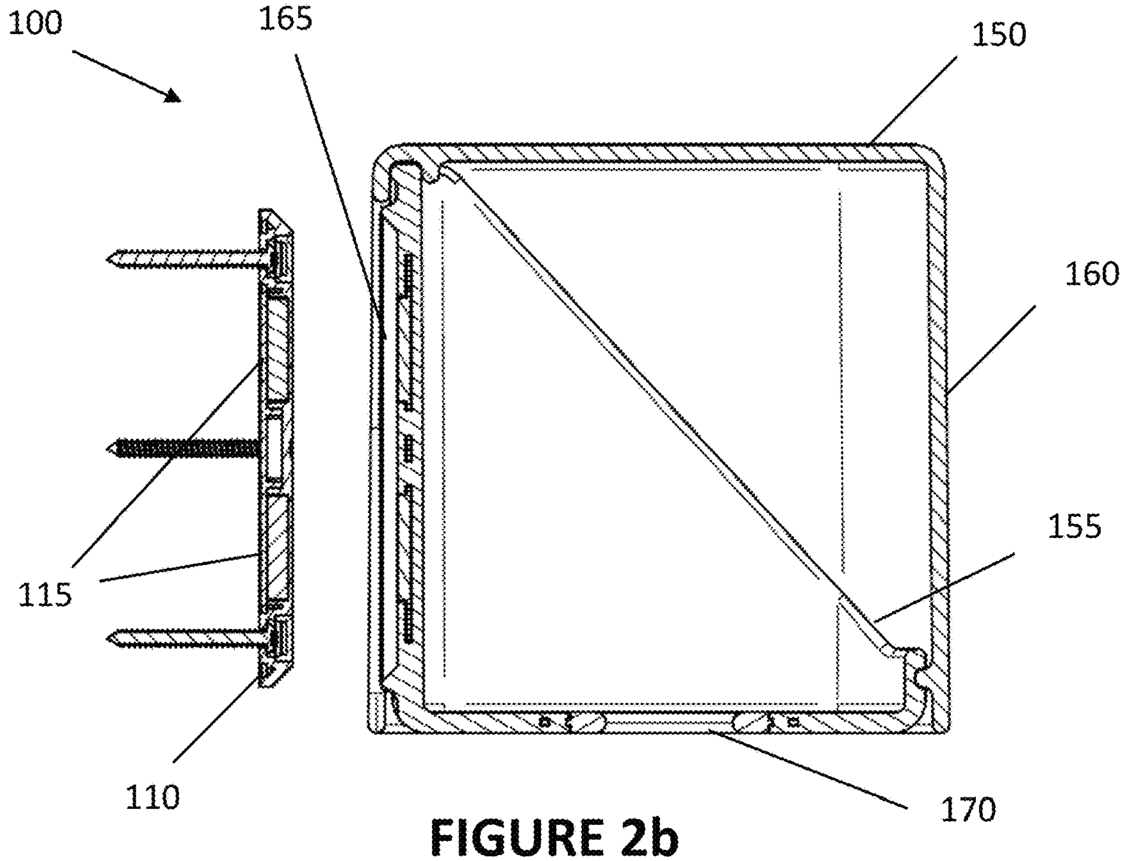

FIG. 2*a* illustrates a front view of the dispensing system;

FIG. 2*b* illustrates a sectional view along line A-A indicated in FIG. 2*a;*

Figure 3A:
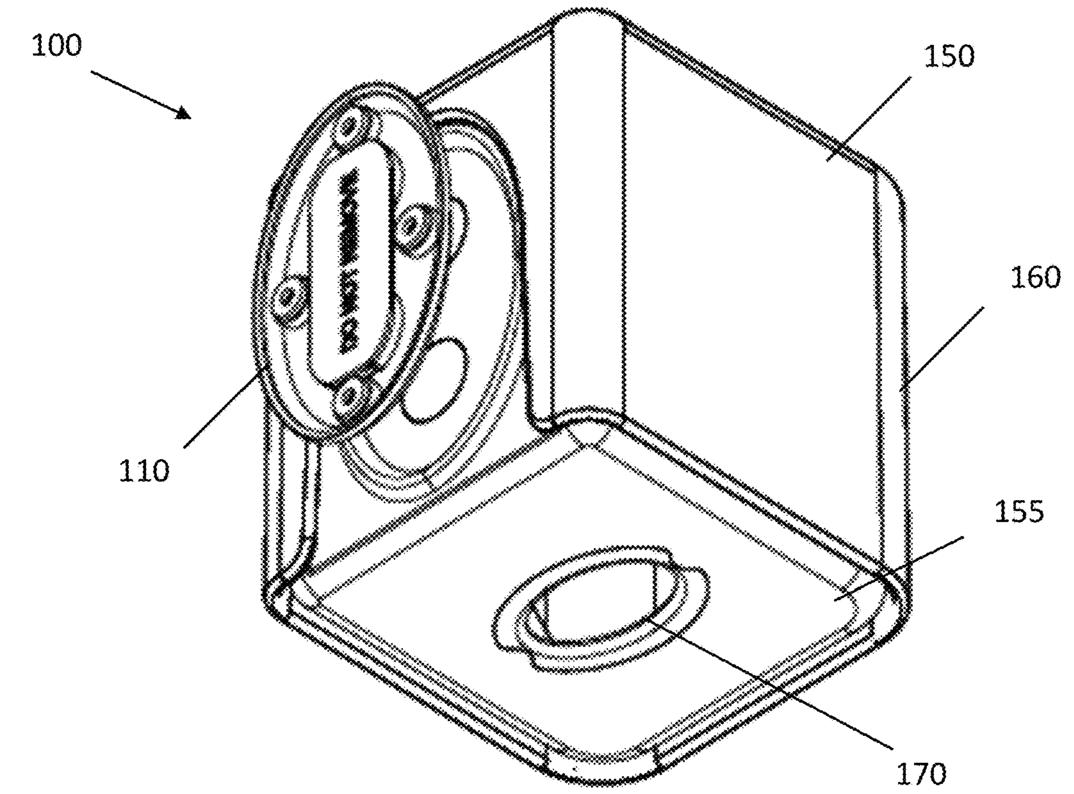
Figure 3B:
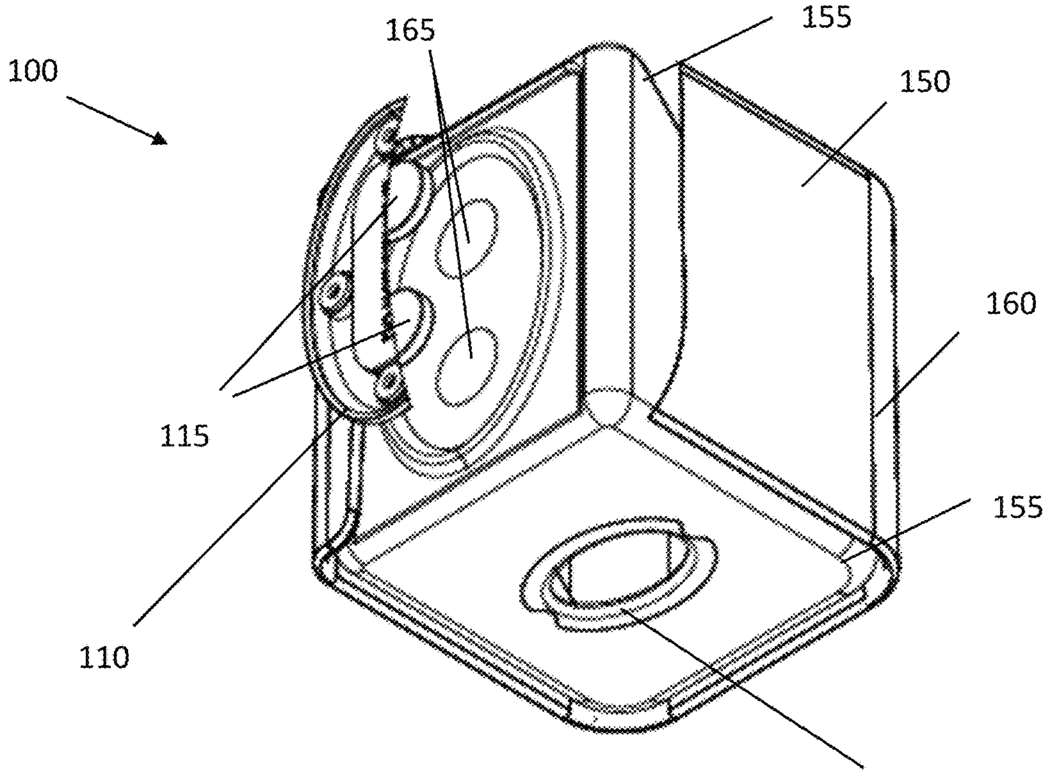
Figure 4:
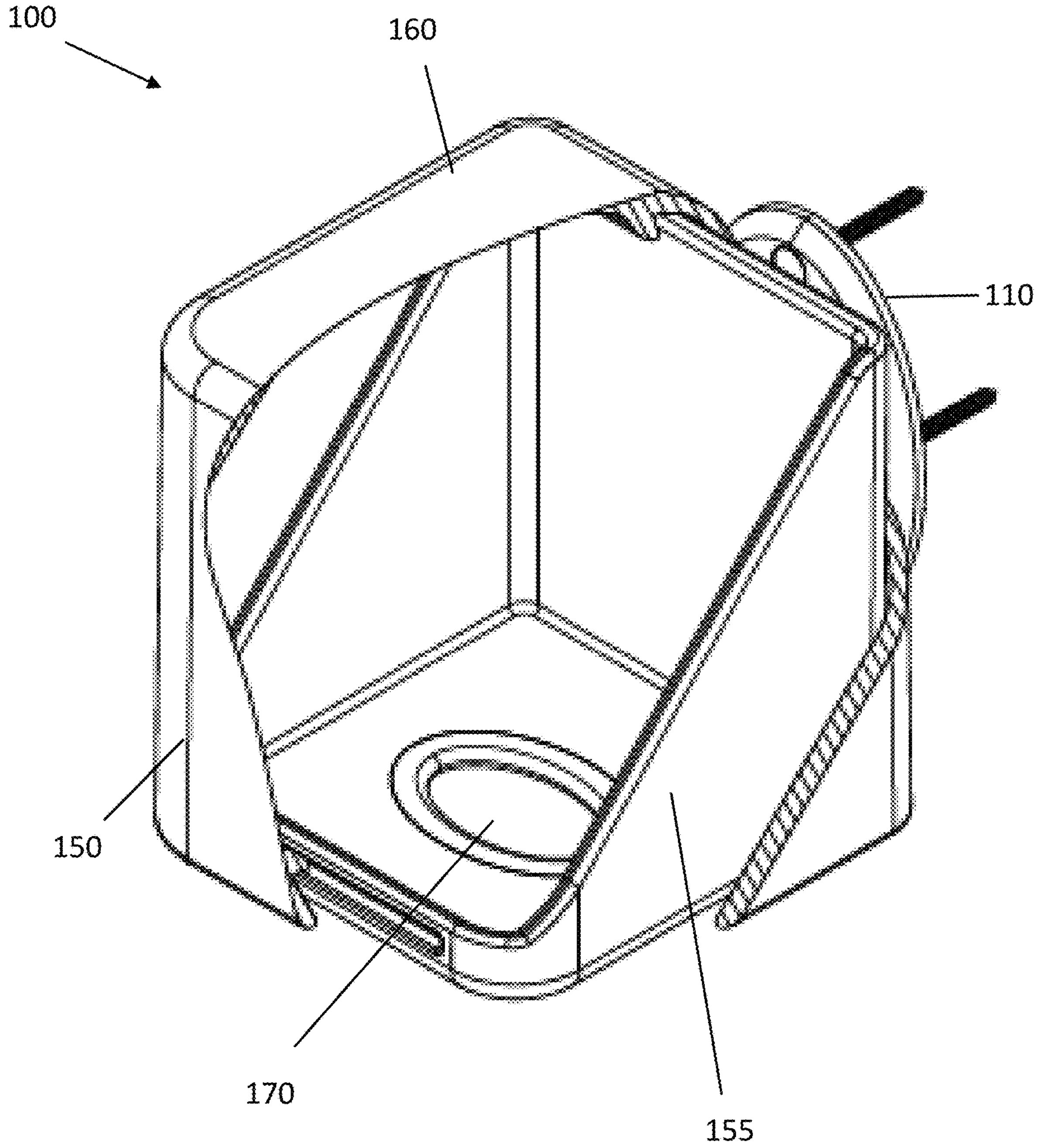

FIGS. 3*a* and 3*b* illustrate rear perspective views of the dispensing system, showing the underside of the system; and FIG. 4 illustrates a perspective view of the dispensing system.

DETAILED DESCRIPTION

FIG. 1 shows a schematic of a dispensing system 100. The dispensing system 100 comprises a mount 110 and a dispenser 150. The dispenser 150 is configured to removably attach to the mount 110. In the illustrated embodiment, the mount 110 is a backing plate with a planar exposed surface 112 and bevelled edges 114. These features prevent the mount being used as a ligature point.

In the illustrated embodiment, the dispenser 150 is a cuboid shell 160 with an opening 170 for dispensing items. In the illustrated embodiment, the opening 170 is on the underside of the shell 160. The shell 160 surrounds a flexible frame 155. The shell 160 and frame 155 are both formed of a flexible material, reducing the weapons risk associated with the dispenser 150. The mount 110 is secured firmly to a surface, such that it could not be removed and used as a weapon.

When a sufficient force is applied the dispenser 150 breaks away from the mount 110. This prevents the dispensing system 100 being used as a ligature point. In embodiments, the dispenser 150 is removably secured to the mount magnetically, with the mount 110 comprising one or more magnetic elements 115 embedded. One or more counterparts are placed within the shell 160 of the dispenser 110. This reduces ease of access to the counterparts 165 and magnetic elements 115 by an end user.

FIG. 2*a* illustrates a front view of the dispensing system 100 of FIG. 1, including a sectional line A-A. FIG. 2*b* illustrates a sectional view of the dispensing system 100 along line A-A indicated in FIG. 2*a*. FIGS. 3*a* and 3*b* illustrate rear perspective views of the dispensing system 100, showing the underside and back of the system 100. FIG. 4 illustrates a perspective view of the dispensing system 100, with layers partially transparent so as to show the shell 160 and frame 155 of the dispenser 150.

From reading the present disclosure, other variations and modifications will be apparent to the skilled person. Such variations and modifications may involve equivalent and other features which are already known in the art of safety door systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A dispensing system, comprising:
a mount;
at least one magnetic element embedded within a body of the mount; and
dispenser, said dispenser comprising:
a frame comprising a flexible material;
a cuboid shell surrounding the frame, the shell formed of a flexible material;
an opening on an underside of the shell for dispensing items; and
at least one magnetic counterpart within the shell;
wherein the mount is configured to attach to a surface, and an exposed surface of the mount is substantially planar to avoid ligature points; and
the dispenser is magnetically secured to the mount.

2. The dispensing system of claim 1, wherein:
the shell comprises at least two layers; and
the frame is disposed within the at least two layers of the shell.

3. The dispensing system of claim 2, wherein:
the magnetic counterpart is disposed within the at least two layers of the shell.

4. The dispensing system of claim 2, wherein:
the at least two layers of the shell are stitched and welded.

5. The dispensing system of claim 2, wherein:
the magnetic attachment force of the dispenser and the mount is configured to be weaker than 500 Newtons, to allow the dispenser to be easily removed from the mount.

6. The dispensing system of claim 2, wherein the shell is vinyl.

7. The dispensing system of claim 2, wherein the dispenser is configured to weigh less than 5 kg.

8. The dispensing system of claim 2, wherein the dispensed items include PPE items such as one or more of tissues, hand towels, aprons, masks, and gloves.

* * * * *